US005585988A

United States Patent [19]

Kutsukake et al.

[11] Patent Number: 5,585,988
[45] Date of Patent: Dec. 17, 1996

[54] TAPE CASSETTE, TAPE CASSETTE HALVES FORMING MOLD, AND METHOD FOR PREPARING A TAPE CASSETTE

[75] Inventors: Jin Kutsukake, Ueda; Masatoshi Okamura, Saku, both of Japan

[73] Assignee: TDK Corporation, Tokyo, Japan

[21] Appl. No.: 346,189

[22] Filed: Nov. 22, 1994

[30] Foreign Application Priority Data

Nov. 27, 1993 [JP] Japan .................................. 5-321387
May 13, 1994 [JP] Japan .................................. 6-123328

[51] Int. Cl.$^6$ .................................................. G11B 23/02
[52] U.S. Cl. .................................................. 360/132
[58] Field of Search ........................... 360/132; 242/347; 264/250, 255, 248

[56] References Cited

U.S. PATENT DOCUMENTS 5,288,350 2/1994 Kita ............................................ 264/248
5,385,312 1/1995 Kaneda et al. ............................ 242/347

FOREIGN PATENT DOCUMENTS 57102085 12/1955 Japan .
50-16644 6/1975 Japan .
62-161374 10/1987 Japan .
64-52178 3/1989 Japan .
3-57786 6/1991 Japan .
4-45363 4/1992 Japan .
4-62564 5/1992 Japan .
5-36671 5/1993 Japan .
2210352 6/1989 Rep. of Korea ........................ 360/132

*Primary Examiner*—Robert S. Tupper
*Assistant Examiner*—Allen Cao
*Attorney, Agent, or Firm*—Oblon, Spivak, McClelland, Maier & Neustadt, P.C.

[57] ABSTRACT

A tape cassette including an upper half and a lower half to form a casing, both halves integrally connected at corresponding melt-bonding connecting portions through a melt-bonding rib; at least one of the melt-bonding connecting portions of the halves constituted by a concave portion and a convex portion which are engageable together, the engageable concave portion including two sections which are different in depth. The convex portion includes two sections which are different in height, at least one of the coupled concave and convex portion having a melt-bonding rib; and at least one of the engageable concave and convex portions having a hole at a central portion of the melt-bonding ribs.

15 Claims, 21 Drawing Sheets

FIGURE 9
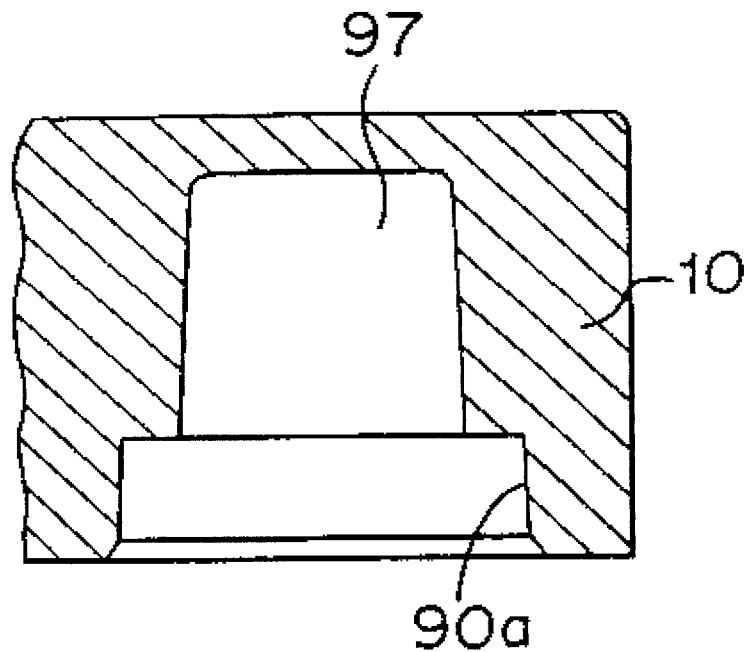
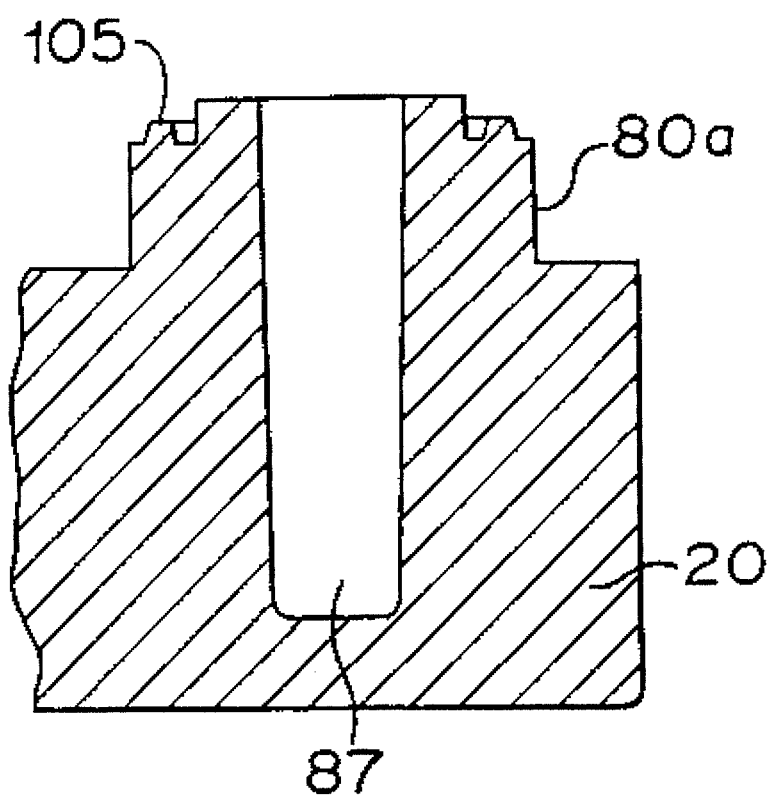

TAPE CASSETTE, TAPE CASSETTE HALVES FORMING MOLD, AND METHOD FOR PREPARING A TAPE CASSETTE

BACKGROUND OF THE INVENTION

1. Field of the Invention

The present invention relates to a tape cassette such as an audio tape cassette, a tape cassette halves forming mold for using a nesting pin mounted into a mold half to provide connecting portions of coupled upper and lower halves forming a casing of such a tape cassette, and a method for using the cassette halves prepared with the mold to prepare such a tape cassette.

2. Discussion of Background

An audio tape cassette has been used in such a manner that a magnetic tape wound on hubs is housed in a casing composed of upper and lower halves. The upper and lower halves include base plates 11 and 21 which has vertical surrounding side plates 12 and 22 of substantially equal height, as shown in FIG. 26 (the upper half 10) and FIG. 27 (the lower half 20). The base plates 11 and 21 have central portions formed with tape quantity observing windows 13 and 23 and hub shaft inserting holes 14 and 24, and an open side to receive a head formed with head house portions 15 and 25 which project like platforms. The base plates 11 and 21 have four corners formed connecting portions 16 and 26, by means of which the base plates are coupled together by machine screws. There are provided similar connecting portions 17 and 27 in a central portion behind the head house portions 15 and 25, cassette positioning holes 18 and 28 on both sides of the connecting portions 17 and 27, and capstan inserting holes 19 and 29. On the base plate 21 is provided casing strengthening bosses 30 and 31 at locations near to the head house portion 25 just behind the central connecting portion 27 and far behind the central connecting portion.

In order to clarify the shape and structure of the lower half 20, in particular the shapes and structures of the hub shaft inserting holes 24, the corner connecting portions 26, the central connecting portion 27 and the casing strengthening bosses 30, 31 and the like, there are shown a plan view of the lower half 20 in FIG. 28, and a cross-sectional view taken along a section line 29—29 of FIG. 28 in FIG. 29. As clearly shown in FIGS. 28 and 29, the corner connecting portions 26 and the central connecting portion 27 are similar circular posts with the same diameter and tapped holes. However, the central connecting portion 27 has the opening of the hole formed at a higher level and the hole formed deeper than those of the corner connecting portions 26. The casing strengthening boss 30 at the front side is a long, slender circular post, whereas the casing strengthening boss 31 at the rear side is a thick cylindrical post. The connecting portions 26 on the four corners of the base plate 21 have the same structure.

A corner connecting portion 16 of the upper half 10 which corresponds to a corner connecting portion 26 of the lower half 20 has a structure shown in FIG. 30. The other corner connecting portions 16 and the central connecting portion 17 of the upper half 10 have the same or substantially the same structure as the corner connecting portion 16 shown in FIG. 30. The upper and lower halves 10 and 20 are separately prepared by using different molds which comprise a cavity and a core. The respective halves 10 and 20 are independently molded by means of injecting molding of plastics. In such a molding process, when the corner connecting portions 16 are formed, a mold 40 for molding the upper half 10 has nesting pins 50a and 50b fitted into the cavity 40a and the core 40b to form connecting portions for machine screw connection as shown in FIG. 31. The other connecting portion 17 is also formed by using the same or substantially the same nesting pins 50a and 50b. When the corner connecting portions 26 are formed, a mold 60 for forming the lower half 20 has no nesting pin fitted into the cavity 60a, and have a nesting pin 70a fitted into the core 60b to form the connecting portions for machine screw connection as shown in FIG. 32. The other connecting portion 27 is also formed by using the same or substantially the same nesting pin as the nesting pin 70a.

When the upper and lower halves 10 and 20 have the connecting portions 16, 17, 26 and 27 at five spots, respectively, and the corresponding connecting portions are connected by machine screws, the upper and lower halves 10 and 20 are firmly connected together to provide a casing, and have an advantage in that disassembling is possible when a problem occurs. However, connecting the upper and lower halves 10 and 20 by using of machine screws causes a product to be costly and prevents production rate from increasing. In order to cope with those problems, methods for connecting the upper and lower halves by melt-bonding have been proposed in Japanese Examined Patent Publication No. 16644/1975, Japanese Unexamined Utility Model Publication No. 102085/1982, Japanese Unexamined Utility Model Publication No. 57786/1991, Japanese Unexamined Utility Model Publication No. 36671/1993 and so forth. Such melt-bonding methods are roughly divided into measures to provide pillar-shaped projections at four corners and at the locations of the head house portions of upper and lower halves, which correspond to the conventional connecting portions for machine screw connection, and carry out melt-bonding at those locations, and measures to provide ridges on tipped surfaces of side plates of upper and lower halves and to subject those ridges to melt-bonding.

However, the latter melt-bonding method, i.e. the measure to provide melt-bonding ridges on the tipped surfaces of the side plates creates a problem in that when the upper and lower halves are matched and melt-bonded together, a part of the melted ridges is likely to squeeze out and misalignment of the upper and lower halves can occur. With respect to this point, the former melt-bonding method does not create such a problem, though a new tape cassette casing mold for melt-bonding is required, creating a great problem in the expense of the mold.

Although it is thought out that only the connecting portions at the corners are melt-bonded without melt-bonding the surrounding portions of the halves which are good in appearance, there are problems in that a bonding force is inevitably so poor that the connecting portions are likely to be separated or damaged due to dropping or other shocks, and are less durable, and that the value of a product can lower due to the presence of a gap or shrinkage in appearance.

SUMMARY OF THE INVENTION

It is an object of the present invention to eliminate those problems, and to provide a new and improved tape cassette having good quality in appearance, making positioning easy and capable of connecting an upper half and a lower half firmly as one unit to form a casing, of contributing to improvement in quality by increasing shock strength remarkably, and of being produced effectively and economically.

It is another object of the present invention to provide a new tape cassette half mold without need for a casing forming mold specialized for melt-bonding, and capable of switching a mold specialized to form a casing for machine screw connection between molding a casing for machine screw connection and molding a casing for melt-bonding connection with ease and at small expense, and of changing melt-bonding methods.

It is a further object of the present invention to provide a method for preparing, effectively and economically, various kinds of tape cassettes including casings which are different in connection manners of upper and lower halves.

According to a first aspect of the invention, there is provided a tape cassette comprising an upper half and a lower half to form a casing; both halves integrally connected at corresponding melt-bonding connecting portions through a melt-bonding rib; at least one of the melt-bonding connecting portions of the halves constituted by a concave portion and a convex portion which are engageable together; the engageable concave portion including two sections which are different in depth; the engageable convex portion including two sections which are different in height; at least one of the coupled concave and convex portion having a melt-bonding rib; and at least one of the engageable concave and convex portions having a hole at a central portion of the melt-bonding rib.

It is preferable that the hole extends toward the inside of the engageable concave or convex portion where the hole is formed.

It is preferable that the engageable concave portion is formed on the upper half, and the engageable convex portion is formed on the lower half.

It is preferable that the engageable concave and convex portions comprise a cylindrical concave portion and a cylindrical convex portion engageable with the cylindrical concave portion, which are formed in a dual cylindrical shape having different diameters.

It is preferable that the cylindrical convex portion has contacting surfaces with different diameters formed with melt-bonding ribs.

It is preferable that the cylindrical convex portion has a contacting surface with a larger diameter formed with a melt-bonding rib, and the cylindrical concave portion has a contacting surface with a smaller diameter formed with another melt-bonding rib.

It is preferable that the cylindrical convex portion has a contacting surface with a smaller diameter formed with a melt-bonding rib, and the cylindrical concave portion has a contacting surface with a larger diameter formed with another melt-bonding rib.

It is preferable that the engageable concave and convex portions have contacting surfaces formed with annular melt-bonding ribs to project therefrom, and the melt-bonding rib around the hole is formed to be taller than the outer melt-bonding rib.

It is preferable that the engageable concave and convex portions have contacting surfaces formed with annular melt-bonding ribs to project therefrom, and the melt-bonding rib around the hole is formed to be shorter than the outer melt-bonding rib.

It is preferable that only a larger diameter section of the convex portion has a contacting surface formed with a melt-bonding rib, and a smaller diameter section of the concave portion is served by the hole.

It is preferable that the cylindrical concave portion is formed in a half annular shape.

It is preferable that the cylindrical concave portion has a portion toward the center of the casing cut out.

According to another aspect of the invention, there is provided a tape cassette casing mold for providing connecting portions with a coupled half on at least 4 corners of upper and lower halves forming a tape cassette casing, wherein when the upper and lower halves are connected by either one of machine screw connection and melt-bonding, a desired nesting pin for forming a connecting portion is fitted into a mold half, and the mold half has such a structure that a machine screw nesting pin and a melt-bonding nesting pin as the desired nesting pin are interchangeable.

According to a further aspect of the invention, there is provided a method for preparing a tape cassette comprising using mold halves which can form either one of halves for machine screw connection and halves for melt-bonding connection; forming an upper half and a lower half by the mold halves; and connecting the upper and lower halves together by machine screw connection or melt-bonding connection to assemble a tape cassette casing.

In accordance with the present invention, when the upper and lower halves are butted against each other to be assembled and are coupled as one unit by melt-bonding, the engageable concave and convex portions on the corners of the halves get into dual engagement wherein projection height or depth is different, and the melt-bonding rib on the contacting surface is melted to obtain firm connection. Such an arrangement can increase strength by receiving shear stress due to dropping on the dual engagement, prevent a melted portion of the melt-bonding rib from squeezing out by causing the melted portion to flow into the hole, be useful for avoiding shrinkage on appearance, get good quality on appearance, facilitate positioning, allows both halves to be firmly connected as one unit to form the casing, increase shock strength significantly to contribute to improved in quality, and establish economical production effectively.

Since there is provided the structure wherein the nesting pin for machine screw connection and the nesting pin for melt-bonding are interchangeable to the mold halves, only new preparation of the nesting pin for melt-bonding is enough to change a mold specialized for molding halves for machine screw connection to a mold for molding halves for melt-bonding easily, and to return the mold for molding halves for melt-bonding to the mold for molding halves for machine screw connection easily. As a result, it is convenient that molding halves for machine screw connection and molding halves for melt-bonding can be carried out as desired without new preparation of a mold specialized for molding halves for melt-bonding. If selection of nesting pins for melt-bonding having different shapes is possible, the manner of melt-bonding can be changed easily.

If a mold which can form either one of halves for machine screw connection and halves for melt-bonding connection is used, it is possible to easily make change between molding of halves for machine screw connection and molding of halves for melt-bonding, and between halves for melt-bonding having different manners in melt-bonding by interchanging nesting pins. Upper and lower halves thus molded are assembled as one unit by machine screw connection or melt-bonding. By such an arrangement, small-quantity production of tape cassettes which include casings having different connection manners can be realized easily, and the production cost lowers. It is very convenient for many kinds and small-quantity production.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 9 is a view similar to FIG. 3, showing another modified example of the cylindrical concave portion and the cylindrical convex portion;

DESCRIPTION OF THE PREFERRED EMBODIMENTS

Figure 1:
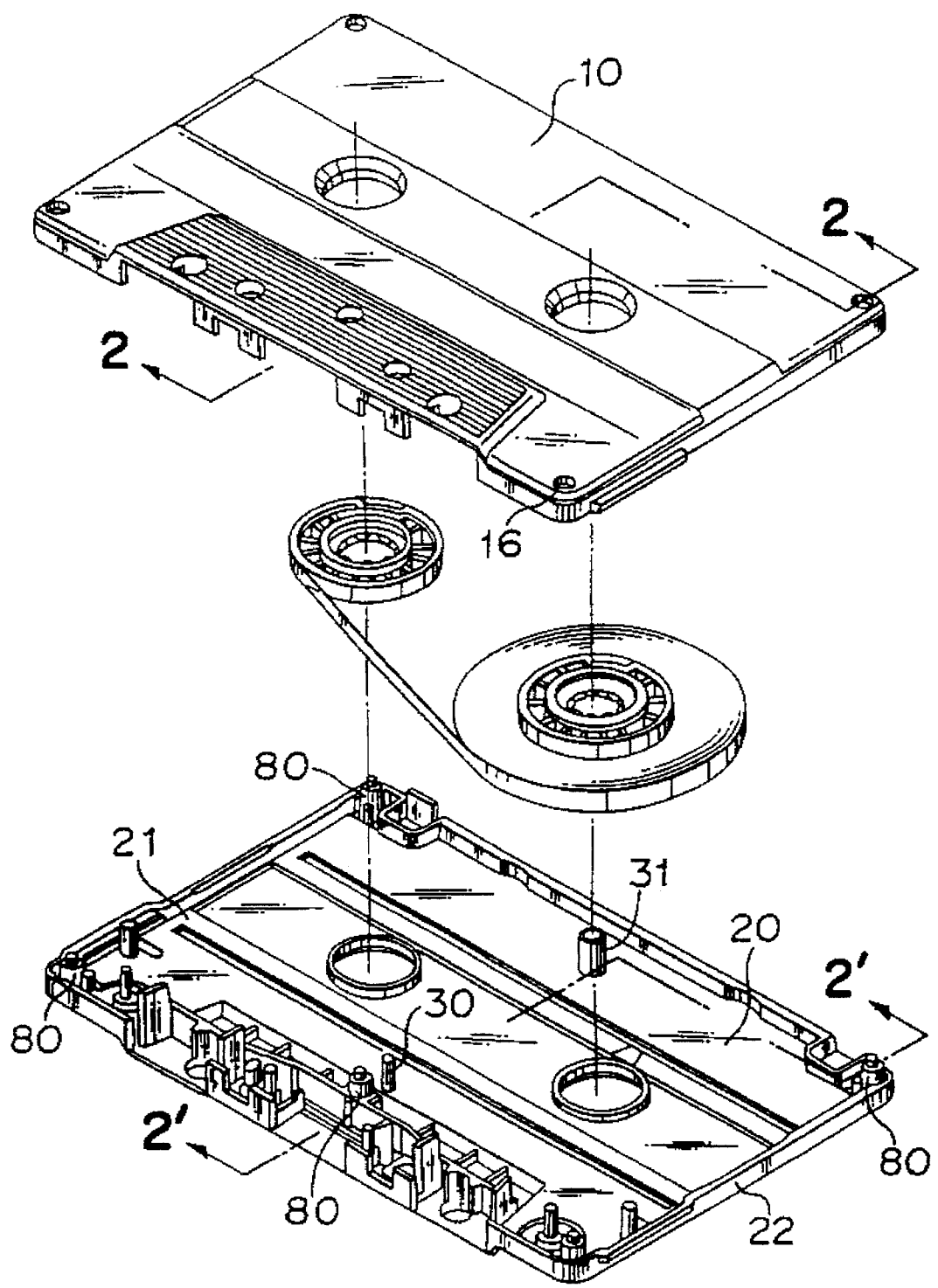
FIG. 1 is a perspective view of an embodiment of the tape cassette according to the present invention in spaced apart relation.
Figure 2:
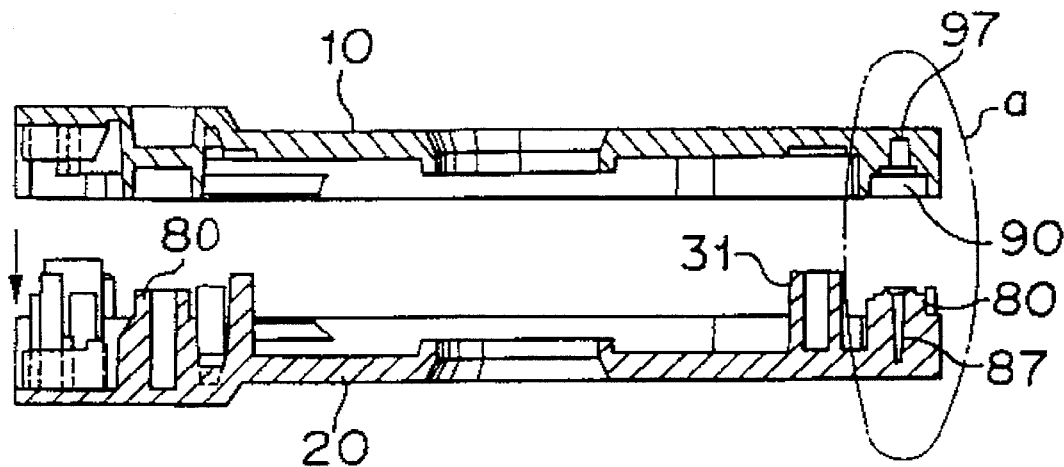
FIG. 2 is a cross-sectional view taken on lines 2—2 and 2'—2' of FIG. 1.
Figure 3:
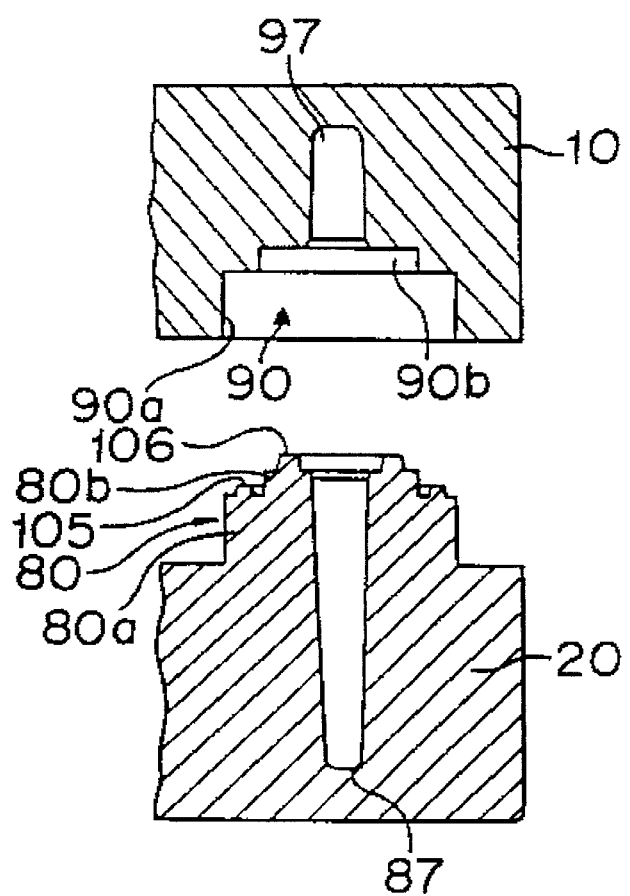
FIG. 3 is an expanded sectional view of the portion indicated by reference "a" in FIG. 2.

An embodiment of the present invention will be described in reference to an audio cassette shown in FIGS. 1 through 4. The tape cassette has an upper half 10 and a lower half 20 forming a tape cassette casing fixed together at corresponding melt-bonding connecting portions, i.e. at least four corners through melt-bonding ribs. The connecting portions of the upper half and the lower half are constituted by engageable concave and convex portions 80 and 90, and the engageable concave and convex portions includes concave and convex sections 80a, 80b, 90a and 90b which are different in projection height or depth and have different diameters. The concave connecting portions or the convex connections portions have melt-bonding ribs 105 and 106 formed thereon in a dual manner. The concave and convex connecting portions have holes 87 and 97 formed in central portions thereof. The concave and convex connecting portions are coupled as one unit by use of a melt-bonding horn to provide the tape cassette.

The engageable concave and convex connecting portions 80 and 90 are constituted by a cylindrical concave portion 90 and a cylindrical convex portion 80 to be engaged with the cylindrical concave 90. The cylindrical concave portion and the cylindrical convex portion are formed in a dual cylindrical shape having different diameters, providing dual engagement wherein engagement is made at the concave and convex sections 80a, 80b, 90a and 90b having different projection height or different depth. This arrangement can ensure, and increase strength by receiving shear stress due to dropping on dual vertical surfaces. Although the projection height and the depth are limited by an automatic device, it should be considered that a step for matching the upper and lower halves involves no trouble. The outer convex section 80a and the outer concave section 90a, which have a larger diameter, are formed with a tighter engagement to receive a shear force mainly, while the inner convex section 80b and the inner concave section 90b, which have a smaller diameter, are formed with a loose engagement. The diameter of the inner convex section is determined such that the melt-bonding rib 106 can be formed on a contacting surface, and the hole 87 can be formed at a central portion in the convex connecting portion. Such an arrangement allows an extra portion of the melted rib 106 to flow into the hole 87, and some of the extra portion to enter the outer engagement if necessary.

The engaged concave and convex sections 80a, 80b, 90a and 90b have contacting surfaces formed thereon stepwise, and the contacting surfaces have the melt-bonding ribs 105 and 106 formed thereon to be annular and to project therefrom. The melt-bonding rib 106 which is around the hole 87 is formed to be taller than the outer melt-bonding rib 105. As a result, the engaged concave and convex connecting portions can have central portions melt-bonded completely and outer peripheral portions melt-bonded in an auxiliary manner. Such an arrangement can realize that when the melt-bonding rib at the central portion is completely melt-bonded, an excess portion of the melted rib flows into the hole 87 or 97 to prevent a gap from causing between the upper and lower halves.

The melt-bonding ribs 105 and 106 may be arranged on either the lower half 20 or the upper half 10. One of the ribs may be arranged on the upper half 10, and the other rib may be arranged on the lower half 20.

Contrary to the embodiment shown, the upper half 10 may include the engageable convex portion, and the lower half may include the engageable concave portion.

The holes 87 and 97 can be formed in such a shape (e.g. in a tapered shape) that nesting is easy in molding. At least one of the upper half 10 and the lower half 20 includes the hole, contributing to avoiding shrinkage on the appearance of the casing.

Figure 4A:
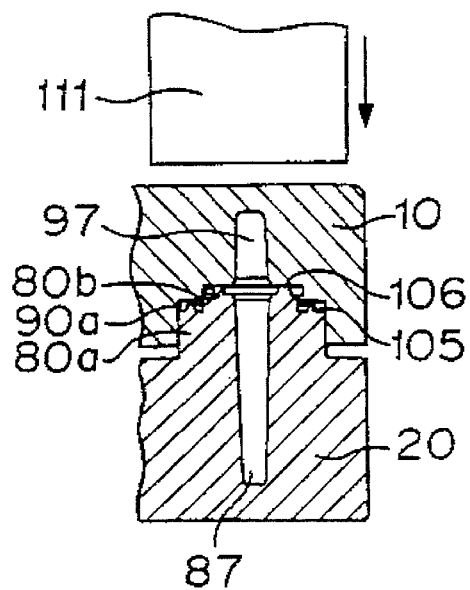
FIGS. 4(A), 4(B), 4(C) and 4(D) are views to help explain different melt-bonding manners.
Figure 4B:
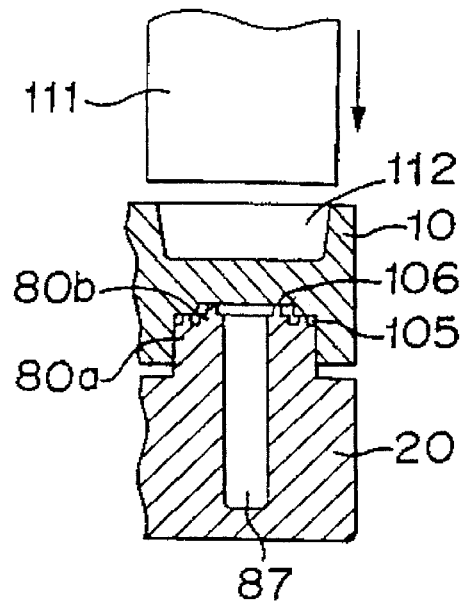
Figure 4C:
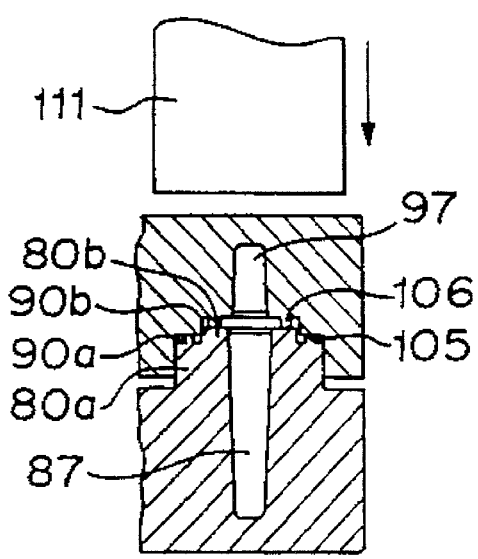

In the cases shown in FIGS. 4(A) and 4(C), the upper and lower halves 10 and 20 have the holes 87 and 97 formed therein, respectively. The melt-bonding ribs 105 and 106 in a dual arrangement are provided on the cylindrical convex sections 80a and 80b in FIG. 4(A), or are provided on the cylindrical convex section 80a and the engaged concave section 90b, respectively in FIG. 4(C). Melt-bonding is made by use of a melt-bonding horn 111.

Figure 4D:
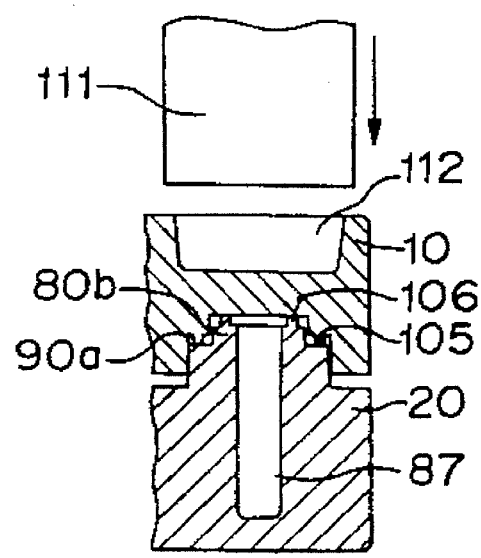

In the cases shown in FIGS. 4(B) and 4(D), only the lower half 20 has the hole 87, and the melt-bonding ribs 105 and 108 are provided on the cylindrical convex sections 80a and 80b in FIG. 4(B), or are provided on the cylindrical concave section 90a and the engaged convex section 80b in FIG. 4(D). The upper half 10 has an outer surface formed with a recess 112 to facilitate processing by the melt-bonding horn.

Figure 5:
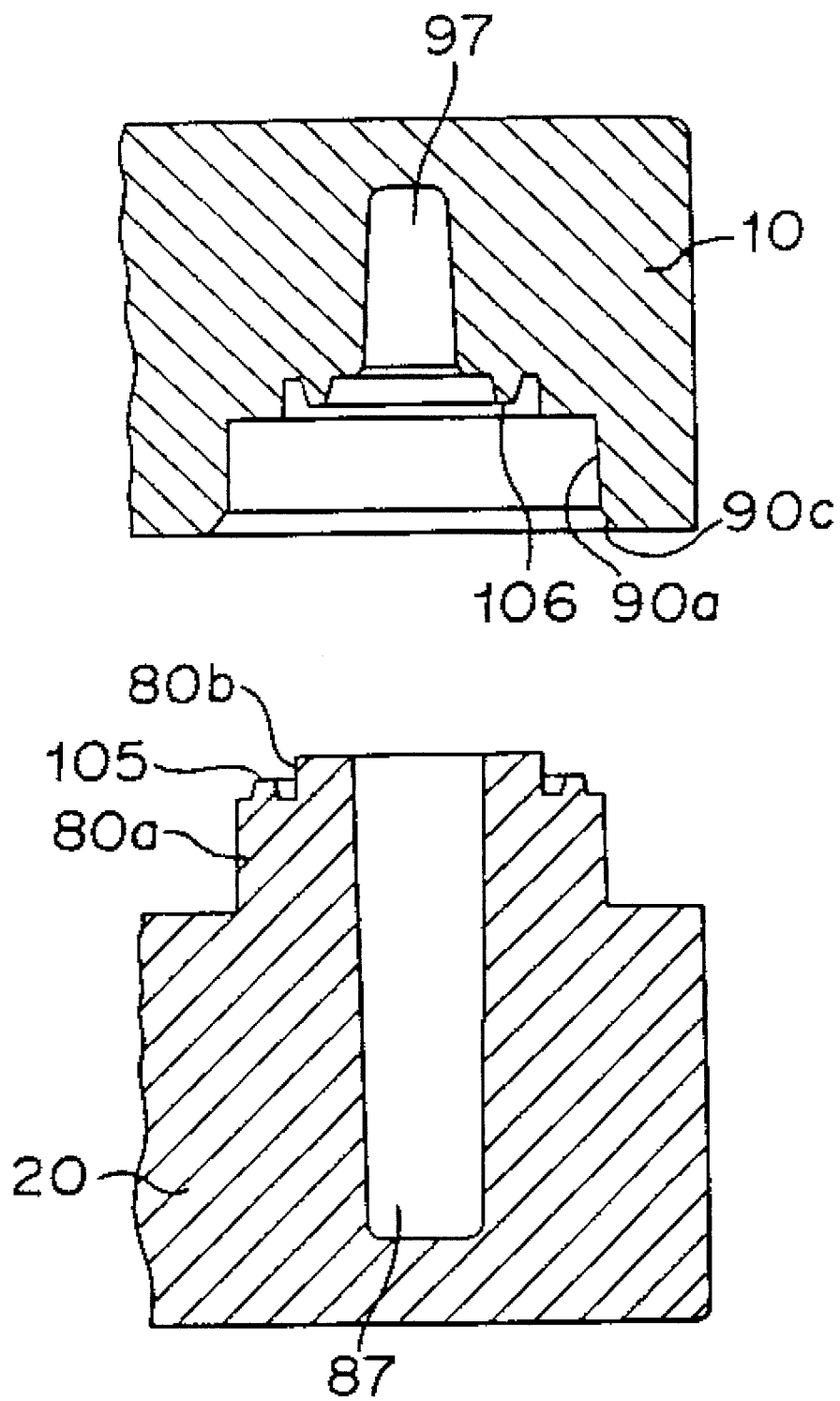
FIG. 5 is a view similar to FIG. 3, showing a modified example of a cylindrical concave portion and a cylindrical convex portion.

An example shown in FIG. 5 is different from the example shown in FIG. 4(C) in that the greater diameter section 90a of the engageable concave portion in the upper half 10 has an opening end formed circumferentially with a tapered portion 90c which is more expanded than the tapered inner circumferential surface of the larger diameter section 90a.

Figure 6:
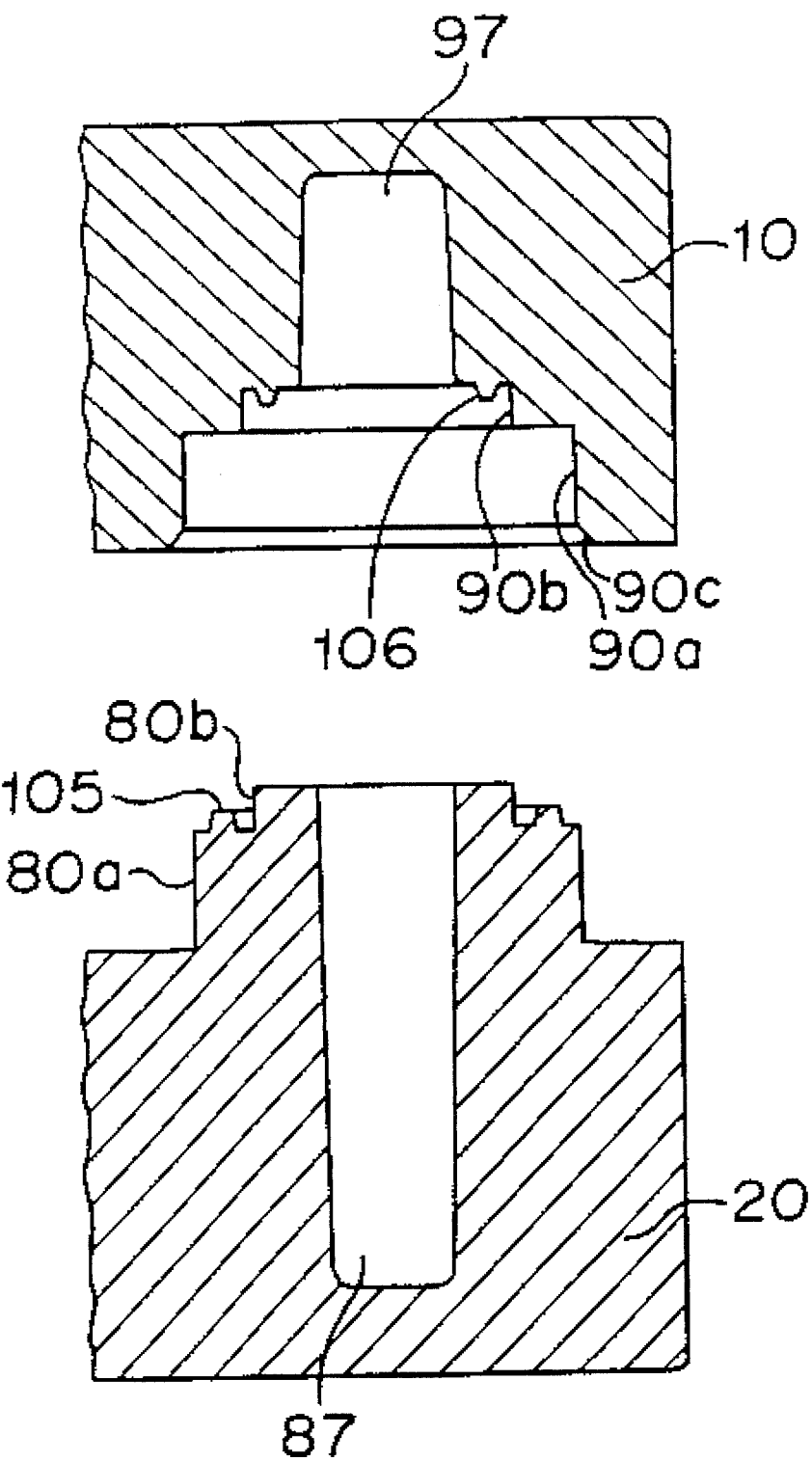
FIG. 6 is a view similar to FIG. 3, showing another modified example of the cylindrical concave portion and the cylindrical convex portion.

An example shown in FIG. 6 is different from the example shown in FIG. 5 in that the wall of the upper half 10 where the hole 97 is formed is made thinner, that the diameter of the nesting pin increases to enlarge the diameter of the hole, and that the inner melt-bonding rib on the upper half 10 is formed to be shorter than the outer melt-bonding rib 105 on the lower half 20. The thinned wall can minimize shrinkage.

Figure 7:
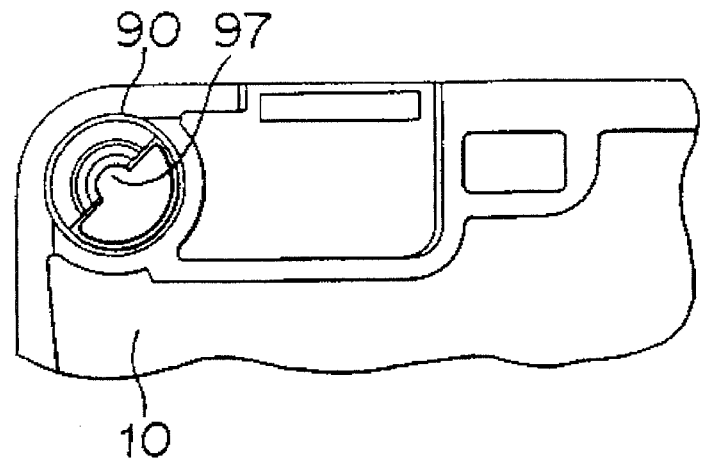
FIG. 7 is a partial plan view showing an other example of the cylindrical concave portion.

In an example shown in FIG. 7, the engageable concave connecting portion 90 of the upper half which is remote from the head house portion has a half portion toward the substantial center of the upper half cut out to have a half annular shape. This structure can obtain an advantage similar to expansion of the hole.

Figure 8A:
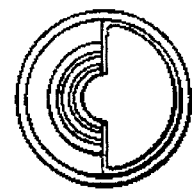
FIGS. 8(A), 8(B) and 8(C) are a plan view, a left side view and a front view showing an example of a nesting pin which is used to form the cylindrical concave portion shown in FIG. 7.
Figure 8B:
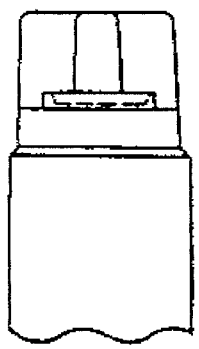
Figure 8C:
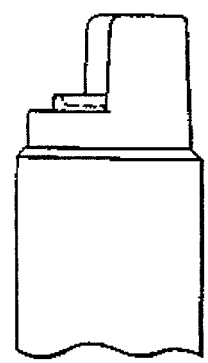

In FIGS. 8(A), 8(B) and 8(C), there is shown a nesting pin which is used to form the engageable concave connecting portion having such a half annular shape.

In an example shown in FIG. 9, the inner melt-bonding rib 106 is omitted, and the hole 97 works as the smaller diameter portion 90b of the engageable concave portion 90 as an additional function. The engageable concave and convex portions shown in FIG. 9 can be applied to the connecting portions which are remote from the head house portion of a tape cassette. The connecting portion which are near to the head house portion are required to have a certain degree of strength. That is why when a tape cassette is inadvertently dropped, the dropping shock is applied to the connecting portions near to the head house. However, the connecting portions on the opposite side of the head house portion can omit the inner melt-bonding ribs 106 because those connecting portions are not required to be as strong as the connecting portions at the side of the head house portion. Such an arrangement can enlarge the hole 97 and make the wall thickness thinner to minimize shrinkage.

Figure 10A:
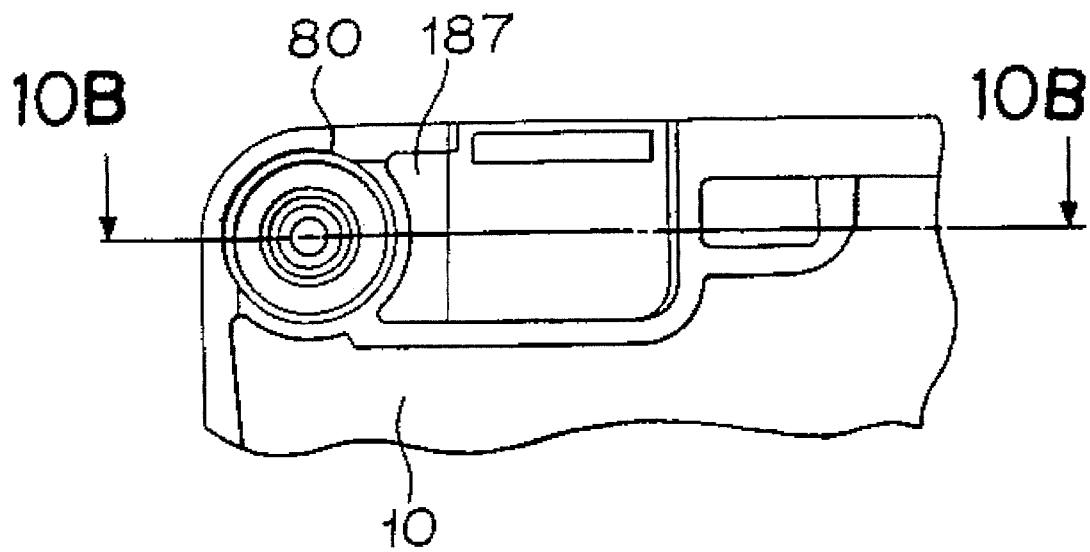
FIGS. 10(A) and 10(B) are a plan view and a cross-sectional view showing a modified example of a portion near to the engagement, FIG. 10(B) being taken along the line B—B of FIG. 10(A)
Figure 10B:
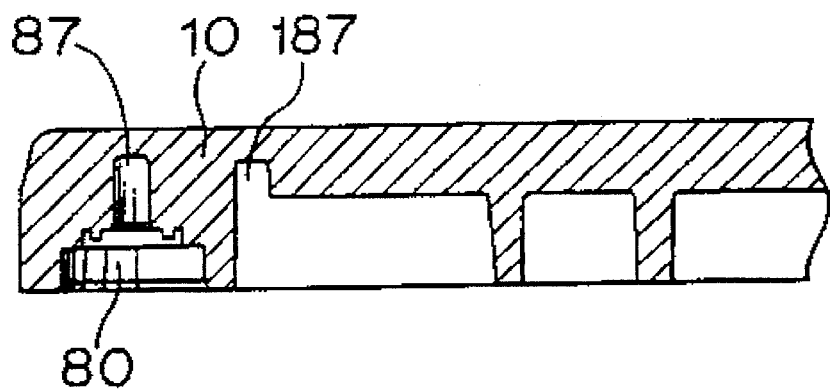

As shown in FIGS. 10(A) and 10(B), the inner surface of the upper half 10 may be lowered at a portion 187 near to a peripheral portion of the engagement portion, i.e. the wall thickness of that portion may be made thinner than other portions, allowing that lowered portion to work as the hole. In this example, it is preferable that the engagement portions at the opposite side of the head house portion are formed to have two step engagement with dual ribs like the connecting portions at the head house portions, which is different from the example shown in FIG. 9.

Figure 11:
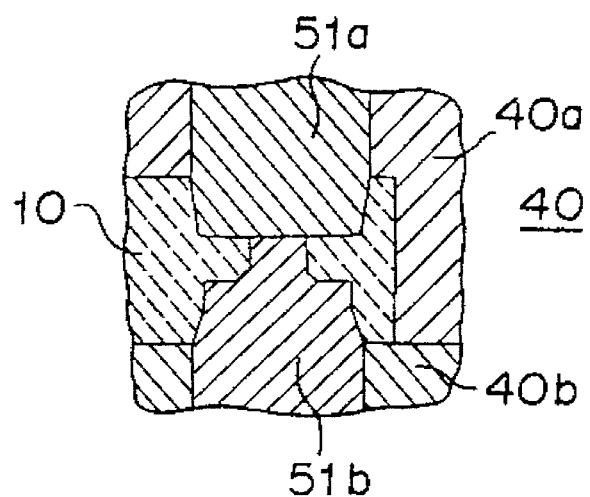
FIG. 11 is a cross-sectional view of a mold for molding an upper half for an audio tape cassette according to the present invention, showing how to mold a riveted melt-bonding portion at a corner of the upper half when the upper half is molded.
Figure 12:
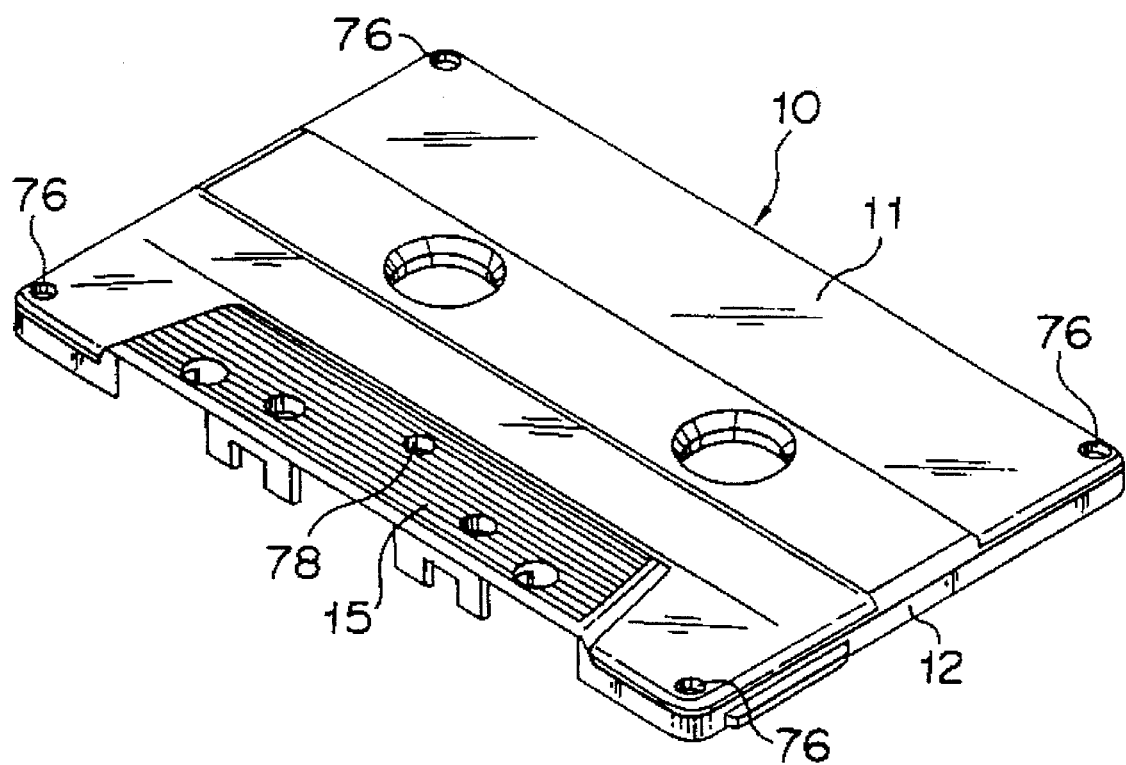
FIG. 12 is a perspective view of the upper half for riveted melt-bonding, which is molded by use of the upper half mold of FIG. 11.

Referring now to FIGS. 11 and 12, there is shown a cross-sectional view of an upper half mold according to the present invention, showing how to mold a riveted melt-bonding connecting portion at a corner on an upper half when the upper half of an audio tape cassette is molded (in FIG. 11), and there is shown a perspective view of the upper half for riveted melt-bonding, which is molded by use of the upper half mold (in FIG. 12). The conventional upper half mold 40 for machine screw connection can be used as the upper half mold for riveted melt-bonding, and the main parts of the conventional mold, such as the cavity 40a and the core 40b can be utilized with no modification. However, since the nesting pins 50a and 50b for machine screw connection have to be replaced by nesting pins 51a and 51b for riveted melt-bonding, the nesting pins 50*a* and 50*b* for machine screw connection are removed from the cavity 40*a* and the core 40*b*, and the nesting pins 51*a* and 51*b* for riveted melt-bonding are fitted in the cavity 40*a* and the core 40*b*, respectively. Replacement of the nesting pins is not limited to one spot, and the nesting pins for machine screw connection at the remaining four spots are replaced by nesting pins identical or substantially identical to the nesting pins 51*a* and 51*b* for riveted melt-bonding. When a plastic material, such as polystyrene, is injected into the upper half mold 40, the upper half 10 for riveted melt-bonding is molded as one unit.

The upper half 10 for riveted melt-bonding has a shape and a structure which are substantially the same as the upper half 10 for machine screw connection. The upper half 10 for machine screw connection has the connecting portions 16 and 17 for machine screw connection at the four corners and at a central portion just behind the head house portion 15, whereas the upper half for riveted melt-bonding has riveted melt-bonding connecting portions 76 and 78 at positions which correspond to the positions of the connecting portions 16 and 17 for machine screw connection. In this connection, when the nesting pins 51*a* and 51*b* for riveted melt-bonding are exchanged for the nesting pins 50*a* an 50*b* for machine screw connection in the cavity 40*a* and the core 40*b* to return the mold to the conventional one, the upper half 10 for machine screw connection can be molded. It takes a short time and is easy to exchange the nesting pins.

Figure 13:
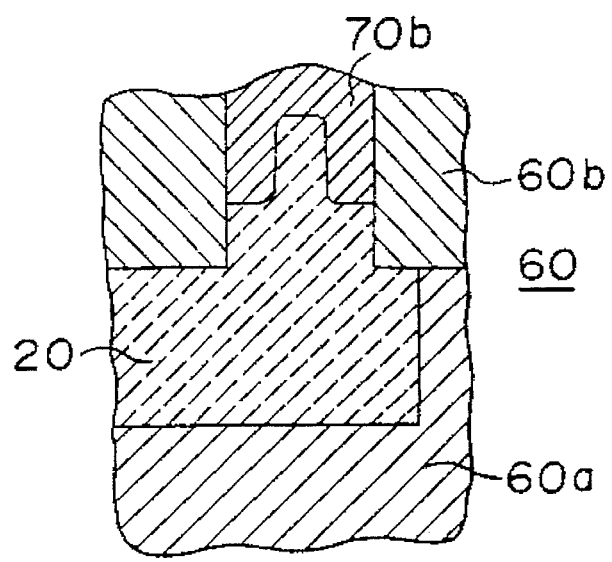
FIG. 13 is a cross-sectional view of a mold for molding a lower half to be combined with the upper half of FIG. 12, showing how to mold a riveted melt-bonding portion at a corner of the lower half when the lower half is molded.
Figure 14:
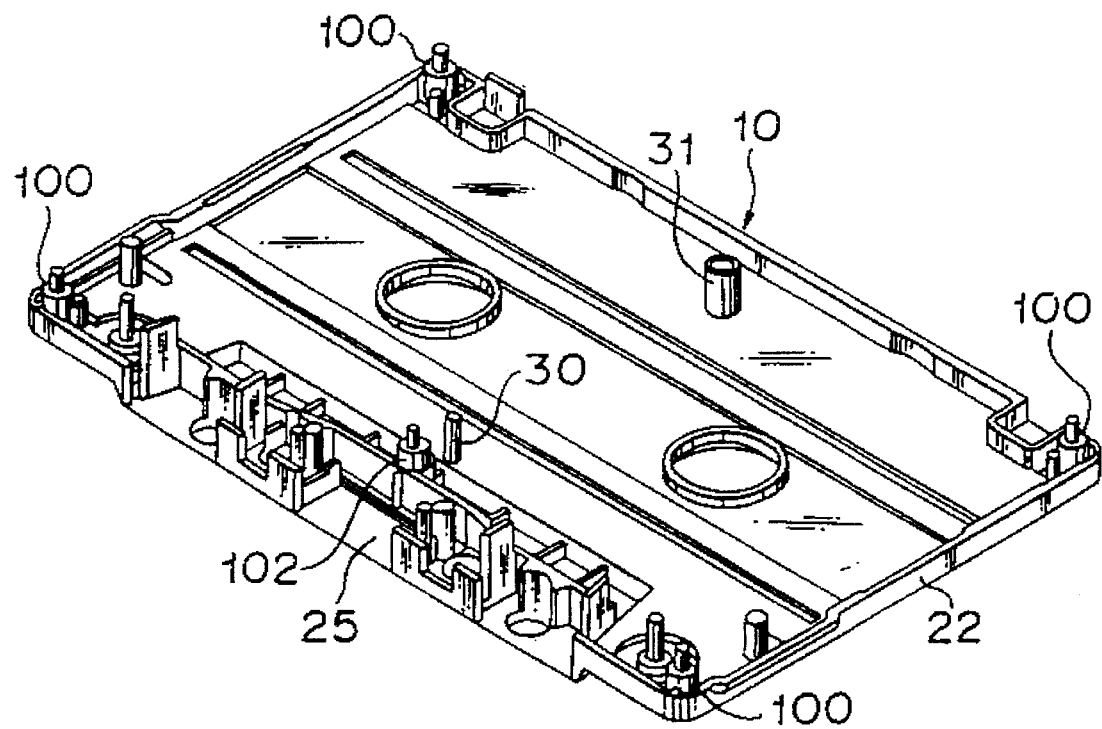
FIG. 14 is a perspective view of the lower half for riveted melt-bonding, which is molded by use of the lower half mold of FIG. 13.

Referring now to FIGS. 13 and 14, there is shown a cross-sectional view of a lower half mold according to the present invention, showing how to mold a riveted melt-bonding connecting portion at a corner of a lower half when the lower half of the audio tape cassette is molded (in FIG. 13), and there is shown a perspective view of the lower half for riveted melt-bonding which is molded by use of the lower half mold. The conventional lower half mold 60 for machine screw connection can be used as the lower half mold like the upper half mold, and the main parts (such as the cavity 60*a* and the core 60*b*) can be used with no modification. However, since the nesting pin 70*a* for machine screw connection has to be replaced by a nesting pin 70*b* for riveted melt-bonding, the nesting pin 70*a* for machine screw connection is removed from the core 60*b*, and the nesting pin 70*b* for riveted melt-bonding is fitted to the core 60*b*. Replacement of the nesting pins is not limited to one spot, and the nesting pins for machine screw connection at the remaining four spots are also replaced by nesting pins which are identical or substantially identical to the nesting pin 70*b* for riveted melt-bonding. When the resin is injected into the lower half mold 60, the lower half 10 for riveted melt-bonding is molded as one unit.

The lower half for riveted melt-bonding has the substantially the same shape and structure as the lower half 10 for machine screw connection. The lower half for riveted melt-bonding is different from the lower half for machine screw connection in that the lower half for machine screw connection has the machine connecting portions 26 and 27 at the four corners and at a central portion just behind the head house portion 25, whereas the lower half 10 for riveted melt-bonding has riveted melt-bonding connecting portions 100 and 102 at positions which correspond to the positions of the machine screw connecting portions 26 and 27. In addition, in the lower half for riveted melt-bonding, a casing strengthening boss 31 has a leading edge formed as a melt-bonding connecting portion.

Figure 15:
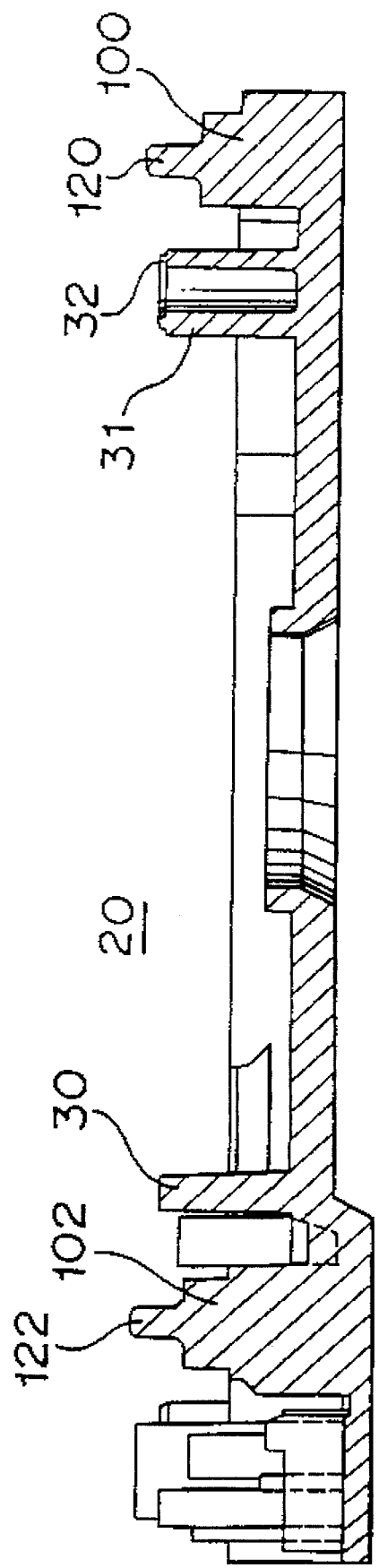
FIG. 15 is a cross-sectional view showing in detail the shape and the structure of the lower half for riveted melt-bonding of FIG. 14, corresponding to FIG. 29.
Figure 29:
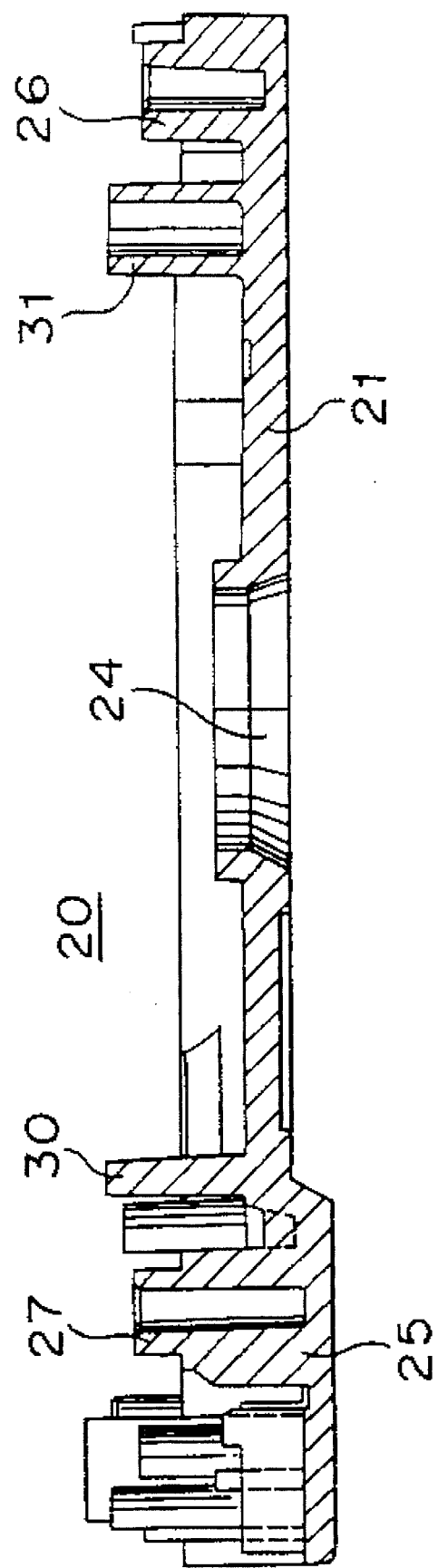
FIG. 29 is an enlarged cross-sectional view taken along the line 29—29 of FIG. 28.
Figure 30:
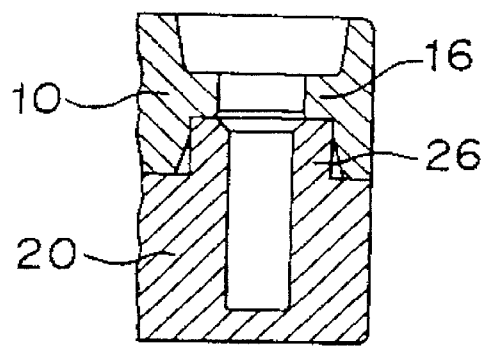
FIG. 30 is a cross-sectional view showing engaged connecting portions at a corner of the halves of the conventional audio cassette, which are in a state just before machine screw connection.
Figure 31:
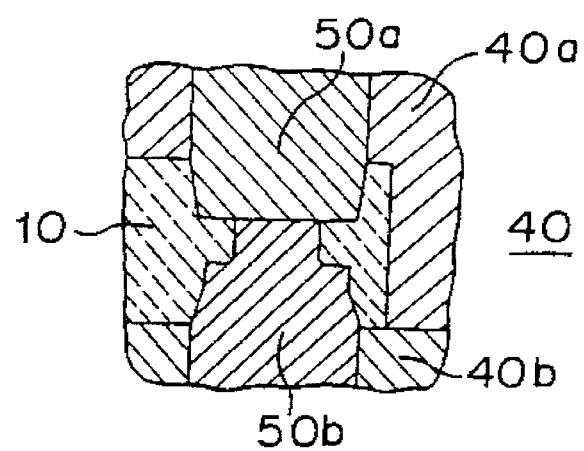
FIG. 31 is a cross-sectional view of a conventional upper half mold, showing how to mold machine screw connecting portions at a corner of the conventional audio tape cassette when the upper half is molded.
Figure 32:
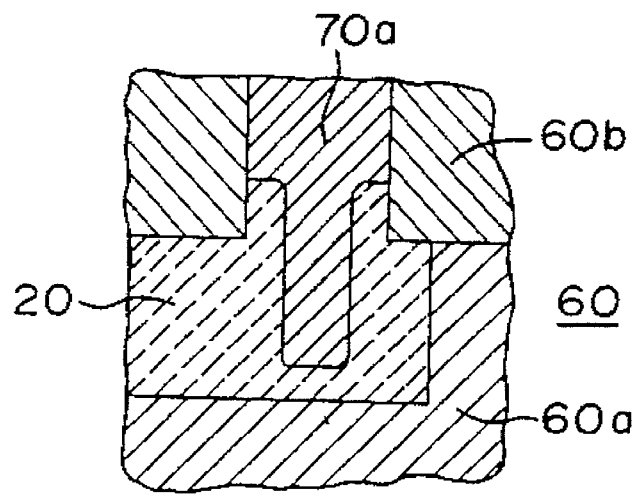
FIG. 32 is a cross-sectional view of a conventional lower half mold, showing how to mold the machine screw connecting portions at the corner of the conventional audio tape cassette when the lower half is molded.

Referring now to FIG. 15, there is shown a cross-sectional view showing in detail the shape and the structure of the lower half 10 for riveted melt-bonding, corresponding to FIG. 29. As clearly shown in FIG. 15, the riveted melt-bonding connecting portions 100 and 102 corresponding to the machine screw connecting portions 26 and 27 are different from the melt-bonding connecting portion on top of the casing strengthening boss 31 in terms of the melt-bonding manner. Specifically, the riveted melt-bonding connecting portions 100 and 102 include circular posts which are central top surfaces provided with piller-like projections 120 and 122 for riveted melt-bonding, respectively, whereas the casing strengthening boss 31 has a top surface formed with a low and ring-like rib 32 to surround an opening. The melt-bonding manner of the melt-bonding connecting portion which is the top of the boss 31 is not changed even if the melt-bonding manner of the other melt-bonding connecting portions 100 and 102 is modified.

Figure 16:
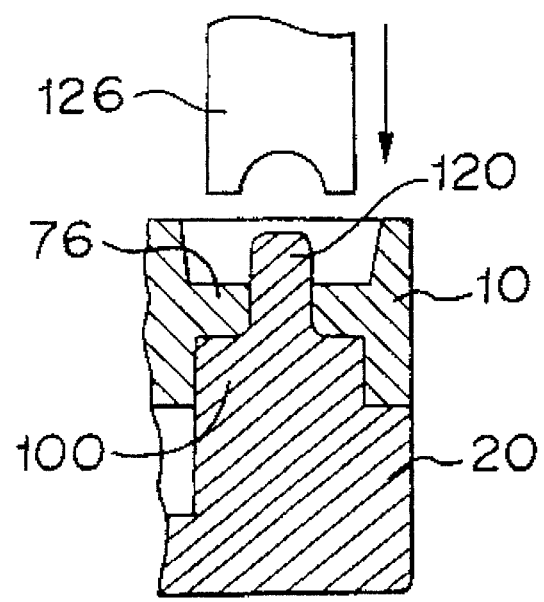
FIG. 16 is a cross-sectional view showing engaged connecting portions at a corner of the halves of FIGS. 12 and 14, which are in a state just before riveted melt-bonding.
Figure 17:
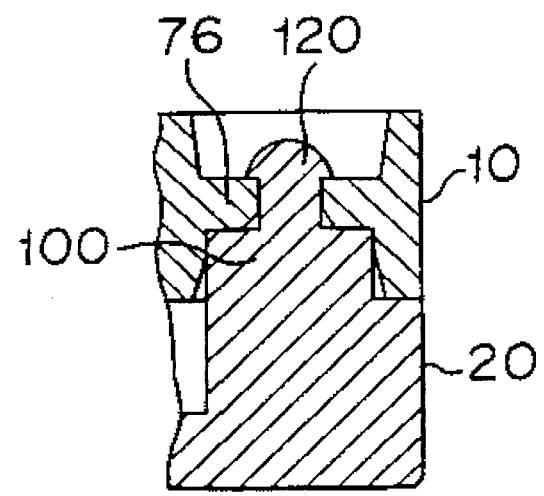
FIG. 17 is a cross-sectional view showing the riveted melt-bonding state of the engaged connecting portions at the corner of the halves of FIGS. 12 and 14.

When the tape cassette is assembled, the lower half 20 has supply and take-up hubs with a magnetic tape wound thereon housed at a predetermined position inside thereof, the upper half 10 is put on the lower half 20, and the connecting portions 76 and 78 at the four corners and at the head house portion 15 of the upper half 10 have through holes accommodated the melt-bonding projections 120 and 122 of the corresponding connecting portions 100 and 102 of the lower half 20 to make engagement, respectively. After that, as shown in FIG. 16, a melt-bonding horn 126 is moved in a direction indicated by an arrow toward the melt-bonding projections 120 and 122 to carry out riveted melt-bonding as shown in FIG. 17. The connecting portion on the top of the casing strengthening boss 31 is connected to a predetermined position on an inner surface of the base plate 11 of the upper half 10 by normal rib-melt-bonding. Melt-bonding of the top end of the casing strengthening boss 31 to the base plate 11 of the upper half 10 is helpful to keep inside dimensions constant and to minimize a possible gap between the side plates 12 and 22 at the side remote from the head house portion even if both halves 10 and 20 have warped. For this reason, it is preferable that even when both halves are connected by machine screw connection, the casing strengthening boss is subjected to rib-melt-bonding connection.

Figure 18:
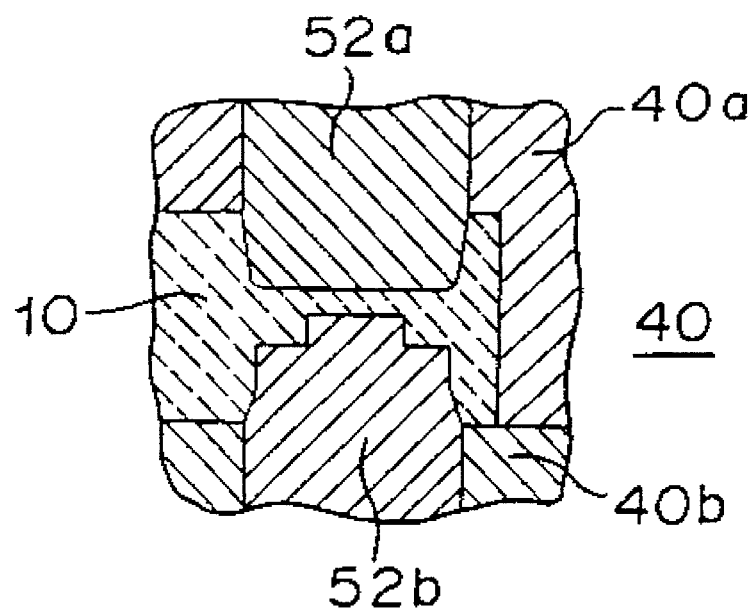
FIG. 18 is a cross-sectional view of a mold for molding another upper half for an audio tape cassette to the present invention, showing how to mold spot-melt-bonding connecting portions at a corner of the upper half when the upper half is molded.

Referring now to FIG. 18, there is shown a cross-sectional view of an upper half mold according to the present invention, showing how to mold a spot melt-bonding connecting portion at a corner of an upper half when the upper half of an audio tape cassette is molded. The conventional upper half mold 40 for machine screw connection can be used as the upper half mold for spot-melt-bonding. Although the cavity 40*a* and the core 40*b* are used with no modification, the machine screw connection nesting pins 50*a* and 50*b* or the riveted melt-bonding nesting pins 51*a* and 51*b* which have been fitted into the cavity 40*a* and the core 40*b* are removed and are replaced by spot-melt-bonding nesting pins 52*a* and 52*b*. Replacement of the nesting pins is not limited to one spot. The replacement is also made at the other four positions. When a polystyrene material or the like is injected into the upper half mold 40, the upper half 10 for spot-melt-bonding is molded as one unit. If the spot-melt-bonding nesting pin 52*a* is formed to be the same as the riveted melt-bonding nesting pin 51, no replacement between the spot-melt-bonding and the riveted melt-bonding is required.

Figure 19:
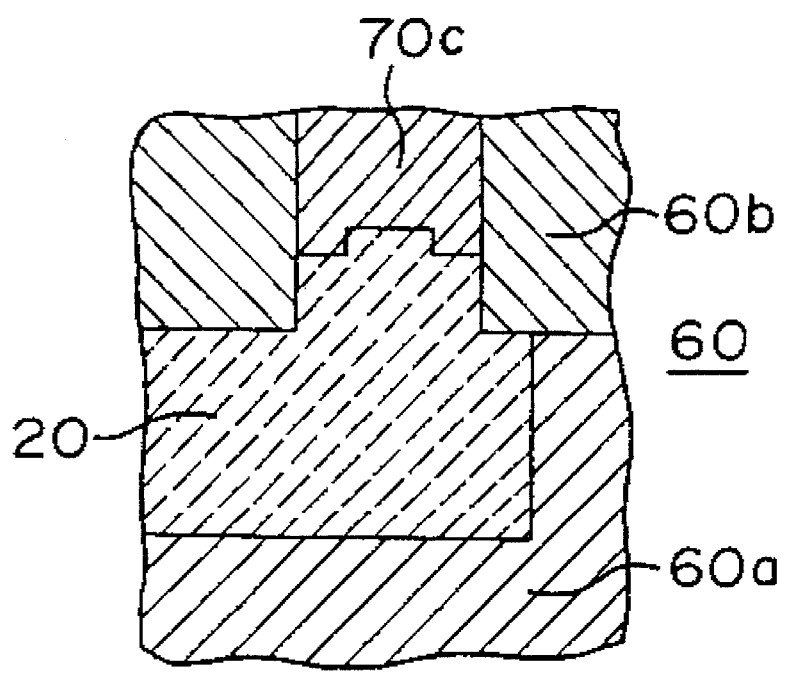
FIG. 19 is a cross-sectional view of a mold for molding another lower half to be combined with the upper half of FIG. 18, showing how to mold a spot-melt-bonding connecting portions at a corner of the lower half when the lower half is molded.

Referring now to FIG. 19, there is shown a cross-sectional view a lower half mold according to the present invention, showing how to mold a spot-melt-bonding connecting portion at a corner of a lower half when the lower half of the audio tape cassette is molded. Like the conventional upper half mold 40, the conventional lower half mold 60 for machine screw connection can be used as the lower half mold for spot-melt-bonding. Although the cavity 60a and the core 60b are used with no modification, the machine screw connection nesting pin 70a or the riveted melt-bonding nesting pin 70b which has been fitted into the core 60b is removed from the core 60b and are replaced by a spot-melt-bonding nesting pin 70c. Replacing of the nesting pins is not limited to one spot, and replacement of machine screw connection or riveted melt-bonding nesting pins at the other four spots are also replaced by nesting pins which are identical or substantially identical to the spot melt-bonding nesting pin 70c. When the polystyrene material or the like is injected into the lower half mold 60, the spot-melt-bonding lower half 20 is molded as one unit.

Figure 20:
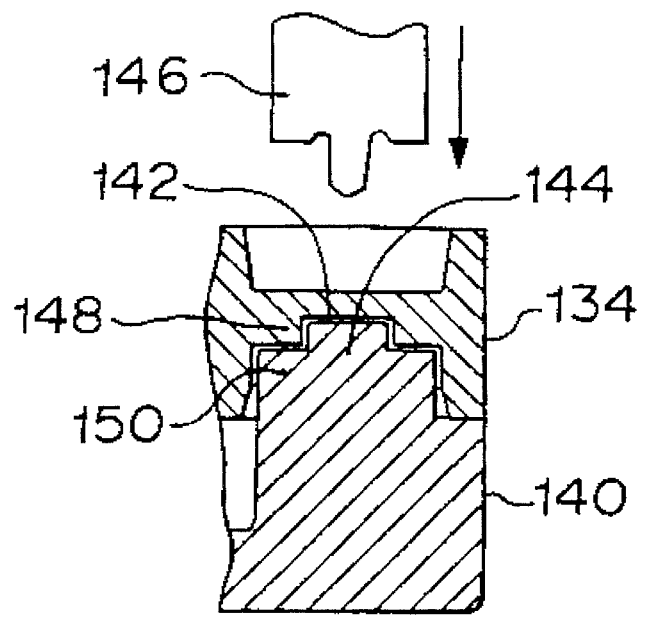
FIG. 20 is a cross-sectional view showing the engaged connecting portions at the corner of the halves, which are in a state just before spot-melt-bonding.
Figure 21:
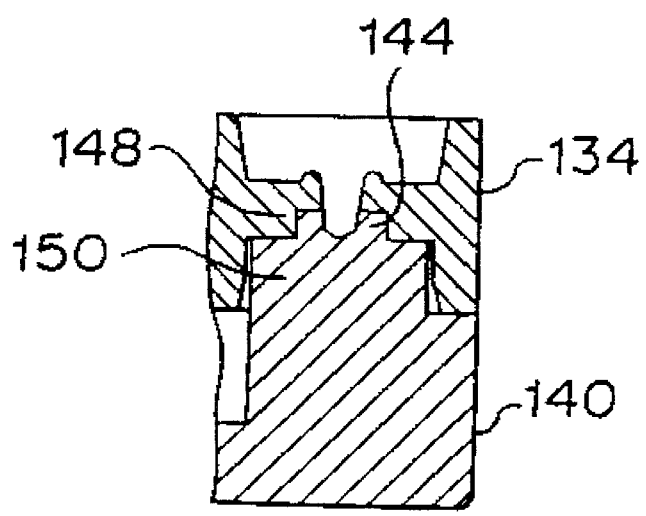
FIG. 21 is a cross-sectional view showing the spot-melt-bonding state of the engaged connecting portions at the corner of the halves.

When the tape cassette is assembled, the lower half 20 has supply and take-up hubs with a magnetic tape wound thereon housed at a predetermined position therein, the upper half 10 is put on the lower half 20, and the connecting portions at the four corners and at the head house portion of the upper half 10 have recesses 142 received the melt-bonding projections of the corresponding melt-bonding portions of the lower half 20. After that, as shown in FIG. 20, a melt-bonding horn 146 is moved in a direction indicated by an arrow toward the melt-bonding projections 144 which are fitted into the recesses 142, respectively. In that manner, spot welding is carried out as shown in FIG. 21. Reference numeral 148 designates a connecting portion of the upper half 10, and reference numeral 150 designates a connection portion of the lower half 20.

Figure 22:
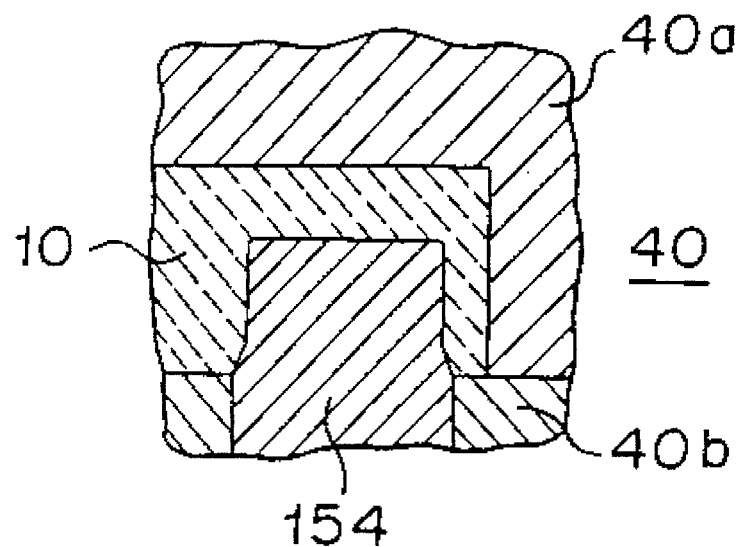
FIG. 22 is a cross-sectional view of a mold for molding another upper half for an audio tape cassette according to the present invention, showing how to mold rib-melt-bonding connecting portions at a corner of the upper half when the upper half is molded.

Referring now to FIG. 22, there is shown a cross-sectional view of an upper half mold according to the present invention, showing how to mold a rib-melt-bonding connecting portion at a corner of an upper half when the upper half of another audio tape cassette is molded. The conventional machine screw upper half mold 40 can be used as the upper half mold in this case as well. Though the cavity 40a and the core 40b are used with no modification, the machine screw connection nesting pins 50a and 50b or the riveted melt-bonding nesting pins 51a an 51b which are fitted into the cavity 40a and the core 40b are removed, and only the core 40b has a rib-melt-bonding nesting pin 154 fitted thereinto. Replacement of the rib-melt-bonding nesting pin is not limited to one spot. The machine screw nesting pins, the riveted melt-bonding nesting pins or the spot-melt-bonding nesting pins at the remaining four spots are replaced by nesting pins which are identical or substantially identical to the rib-melt-bonding nesting pin 154. When the polystyrene material or the like is injected into the upper half mold 40, the rib-melt-bonding upper half is molded as one unit.

Figure 23:
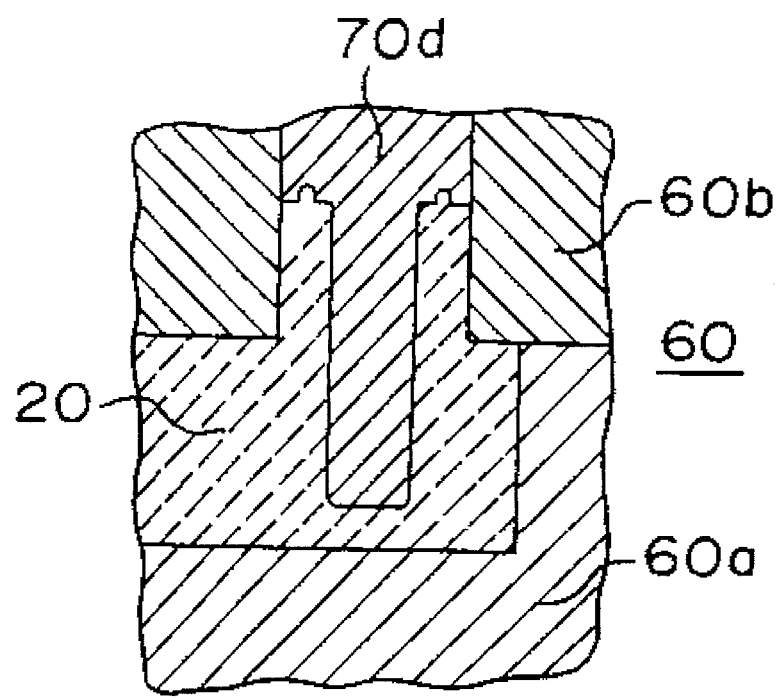
FIG. 23 is a cross-sectional view of a mold for molding another lower half to be combined with the upper half of FIG. 22, showing how to mold rib-melt-bonding connecting portions at a corner of the lower half when the lower half is molded.

Referring now to FIG. 23, there is shown a cross-sectional view of a lower half mold, showing how to mold a rib-melt-bonding connecting portion at a corner of a lower half when the lower half to be combined with the upper half of FIG. 22 is molded. The conventional machine screw lower half mold 60 can be used as the lower half mold in this case as well. Although the cavity 60a and the core 60b are used with no modification, the machine screw nesting pin 70a, the riveted melt-bonding nesting pin 70b or the spot-melt-bonding nesting pin 70c are removed from the core 60b, and are replaced by a rib-melt-bonding nesting pin 70d. Replacement of the nesting pins is not limited to one spot. The machine screw connection nesting pins, the riveted melt-bonding nesting pins or the spot-melt-bonding nesting pins at the remaining four spots are also replaced by nesting pins which are identical or substantially identical to the rib-melt-bonding nesting pin 70d. When the resin is injected into the lower half mold 60, the rib-melt-bonding lower half 20 is molded as one unit.

Figure 24:
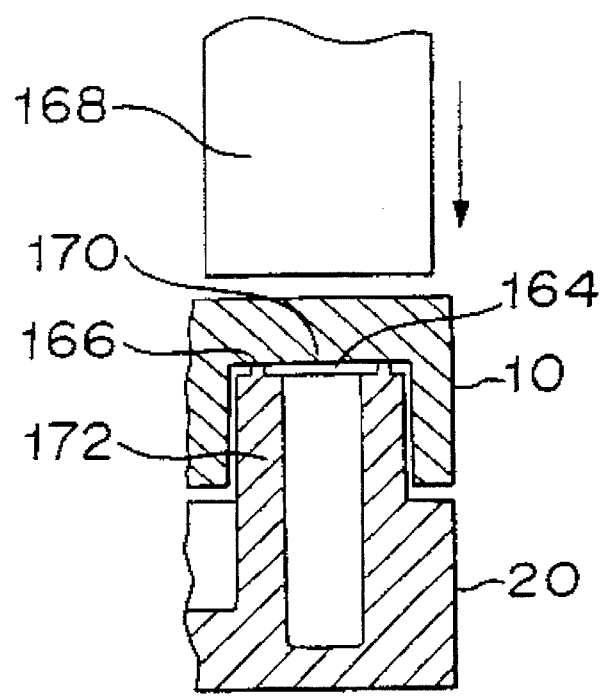
FIG. 24 is a cross-sectional view showing engaged connecting portions at a corner of the halves of FIGS. 22 and 23, which are in a state just before rib-melt-bonding.
Figure 25:
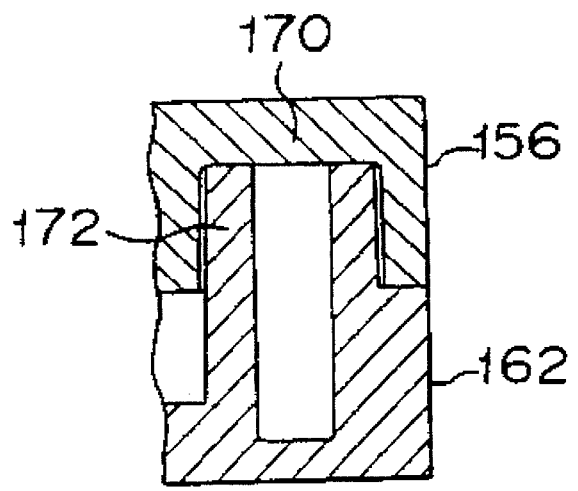
FIG. 25 is a cross-sectional view showing the rib-melt-bonding state of the engaged connecting portions at the corner of the halves of FIG. 24.
Figure 26:
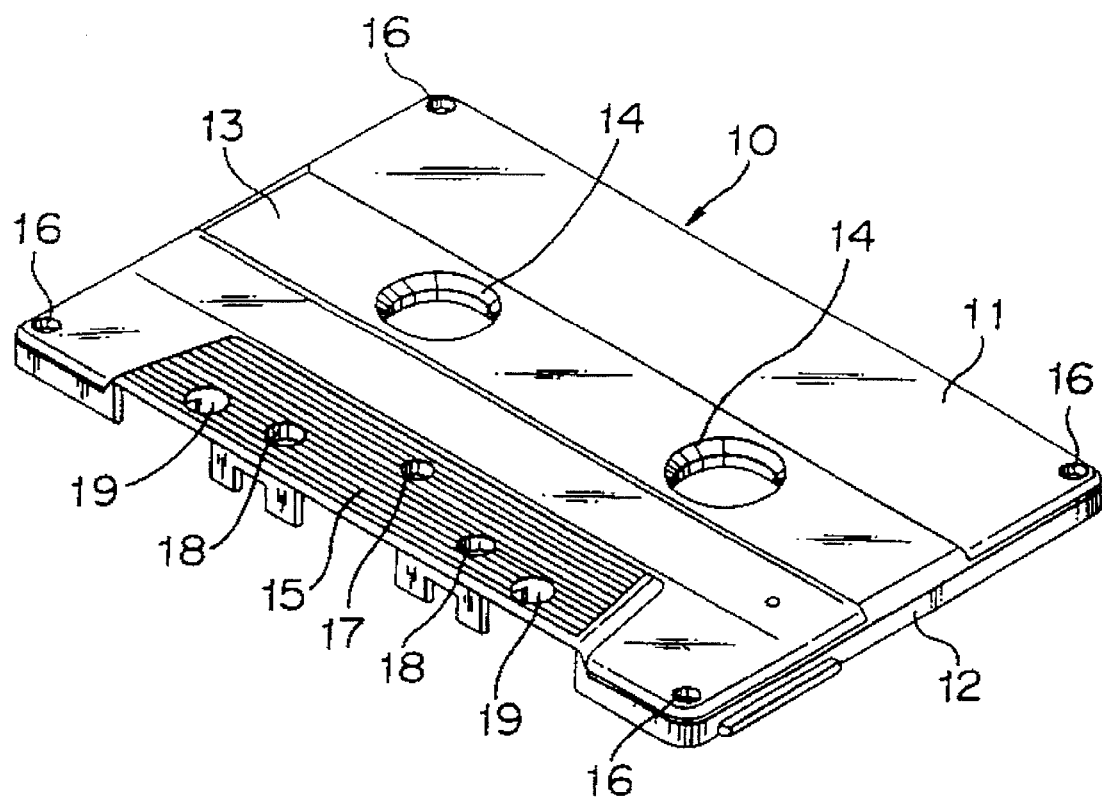
FIG. 26 is a perspective view of an upper half for machine screw connection of a conventional audio cassette tape, which is molded by use of an upper half mold.
Figure 27:
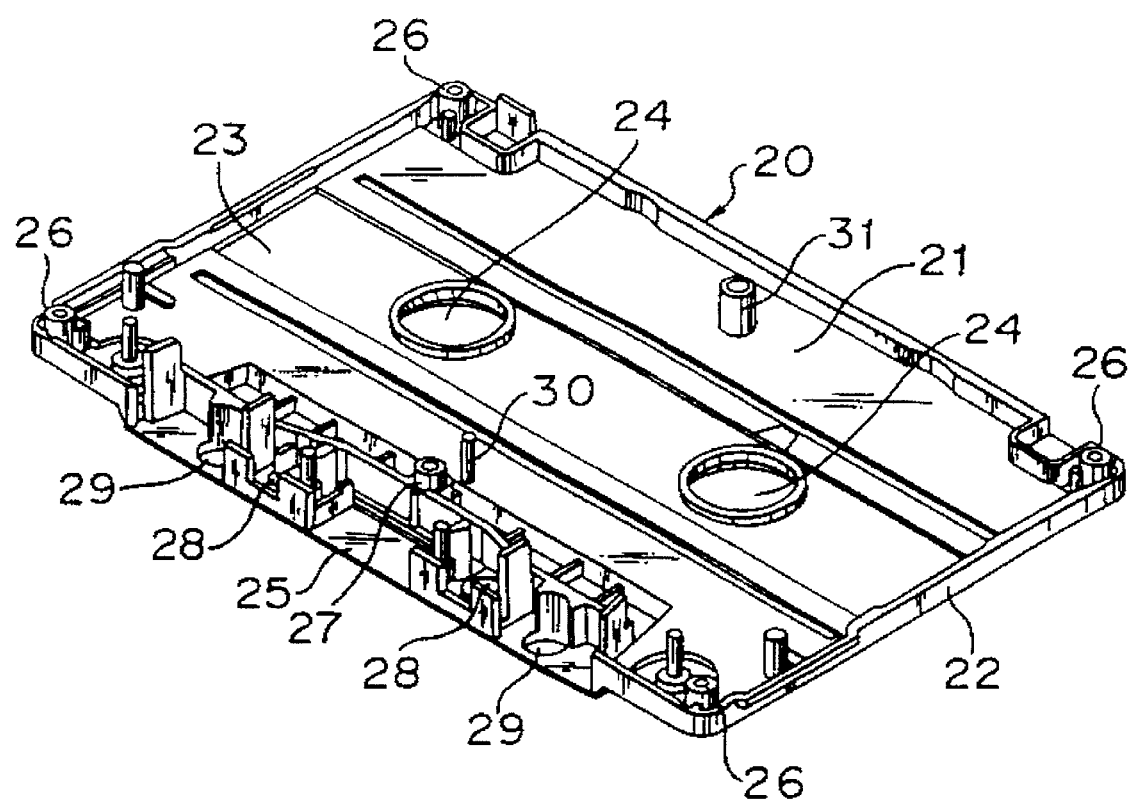
FIG. 27 is a perspective view of a lower half for machine screw connection of the conventional audio cassette tape, which is molded by use of a lower half mold.
Figure 28:
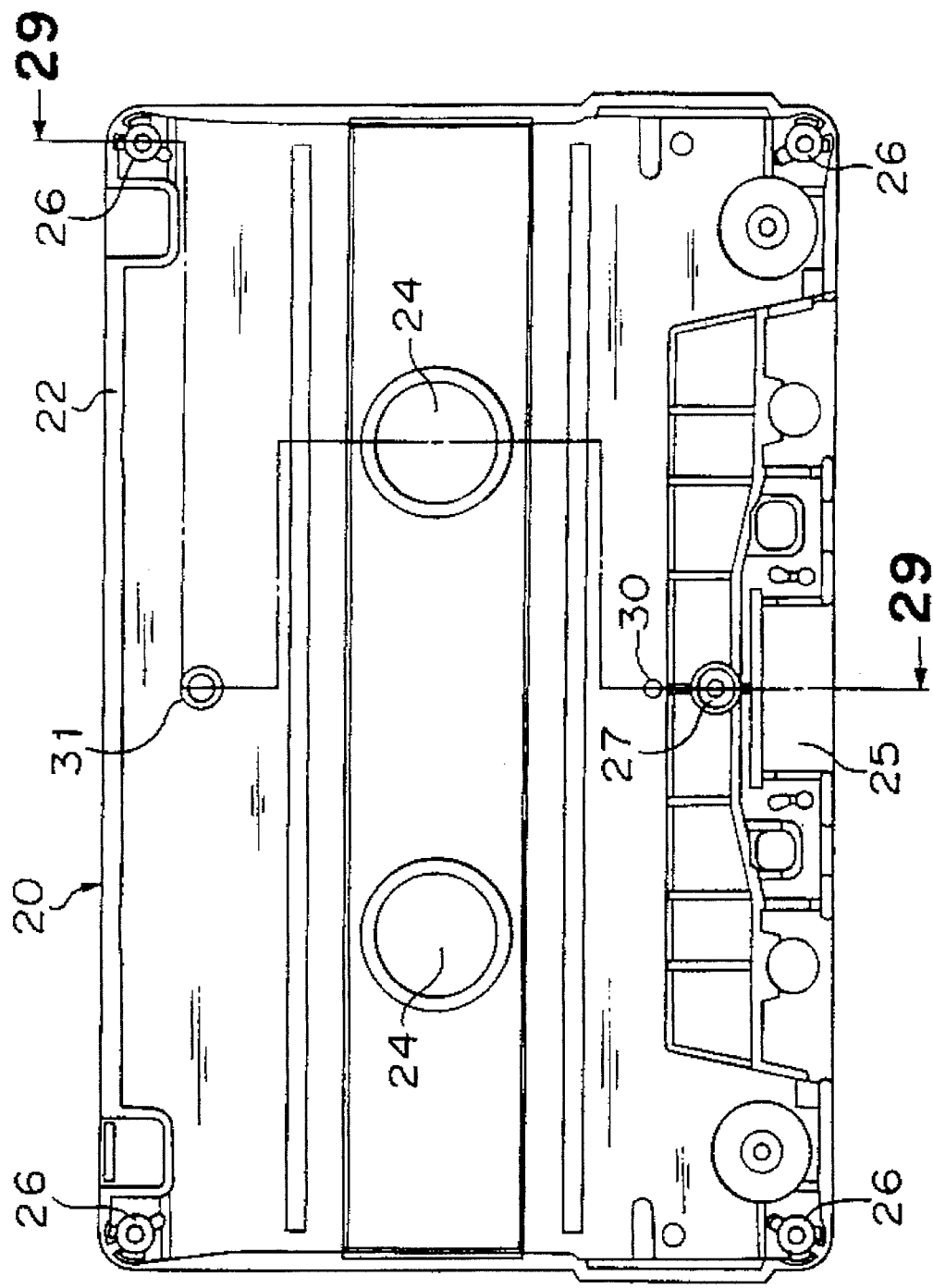
FIG. 28 is a plan view showing in detail the shape and structure of the lower half for machine screw connection of the conventional audio tape cassette.

When the tape cassette is assembled, the lower half 20 has supply and take-up hubs with a magnetic tape wound thereon housed at a predetermined position, the upper half is put on the lower half, and the connecting portions at the four corners and at the head house portion of the upper half 10 have holes received ring-shaped melt-bonding ribs on the corresponding connecting portions of the lower half 20 to establish engagement connection. After that, a melt-bonding horn 168 is moved in a direction indicated by an arrow toward the melt-bonding ribs 166 which are fitted into the holes 164, as shown in FIG. 24. In this manner, rib-melt-bonding is carried out as shown in FIG. 25. Reference numeral 170 designates a connecting portion of the upper half 10, and reference numeral 172 is a connecting portion of the lower half 20.

Obviously, numerous modifications and variations of the present invention are possible in light of the above teachings. It is therefore to be understood that within the scope of the appended claims, the invention may be practiced otherwise than as specifically described herein.

What is claimed is:

1. A tape cassette comprising:

an upper half and a lower half to form a casing;

said upper and lower halves integrally connected at corresponding melt-bonding connecting portions;

at least one of the melt-bonding connecting portions of the halves comprising:

(a) a concave portion and a convex portion which are engaged together;

(b) the engaged concave portion including first and second recessed sections, said first and second recessed sections respectively including first and second bottom surfaces which are disposed at different depths in said concave portion;

(c) the engaged convex portion including first and second projecting sections, said first and second projecting sections respectively including first and second end surfaces which are disposed at different heights, wherein said first projecting section is disposed in said first recessed section, and wherein said second projecting section is disposed in said second recessed section;

(d) at least one melt-bonding rib disposed on and extending from one of said first end surface and said first bottom surface for melt-bonding said first end surface and said first bottom surface together, and (e) at least one of the engaged concave and convex portions having a hole at a central portion of the melt-bonding rib.

2. A tape cassette according to claim 1, wherein the hole extends toward an inside of the at least one of the engaged concave and convex portions where the hole is formed.

3. A tape cassette according to claim 1, wherein the engaged concave portion is formed on the upper half, and the engaged convex portion is formed on the lower half.

4. A tape cassette according to claim 1, wherein the engaged concave and convex portions comprise a cylindrical concave portion and a cylindrical convex portion engaged with the cylindrical concave portion, which are formed in a dual cylindrical shape having different diameters.

5. A tape cassette according to claim 4, wherein the melt-bonding rib is disposed on the first end surface, and wherein a further melt-bonding rib is disposed on said second end surface.

6. A tape cassette according to claim 4, wherein the melt-bonding rib is disposed on the first end surface, and wherein a further melt-bonding rib is disposed on the second bottom surface, and wherein said first end surface has a smaller diameter than said second end surface.

7. A tape cassette according to claim 4, wherein the melt-bonding rib is disposed on the first bottom surface, and wherein a further melt-bonding rib is disposed on said second end surface, and wherein said first end surface has a diameter smaller than said second end surface.

8. A tape cassette according to claim 1, including a further melt-bonding rib disposed on one of said second end surface and said second bottom surface, and wherein said further melt-bonding rib is shorter than said melt-bonding rib disposed on one of the first end surface and the first bottom surface, and wherein the melt-bonding rib and further melt-bonding rib are each projecting annular ribs, said further melt-bonding rib having a larger diameter than said melt-bonding rib.

9. A tape cassette according to claim 4, including a further melt-bonding rib disposed on one of said second end surface and said second bottom surface, and wherein said further melt-bonding rib is shorter than said melt-bonding rib disposed on one of the first end surface and the first bottom surface, and wherein the melt-bonding rib and further melt-bonding rib are each projecting annular ribs, said further melt-bonding rib having a larger diameter than said melt-bonding rib.

10. A tape cassette according to claim 4, including a further melt-bonding rib disposed on one of said second end surface and said second bottom surface, and wherein said further melt-bonding rib is taller than said melt-bonding rib disposed on said one of said first end surface and said first bottom surface, and wherein the melt-bonding rib and the further melt-bonding rib are each projecting annular ribs, said further melt-bonding rib having a larger diameter than said melt-bonding rib.

11. A tape cassette according to claim 4, wherein only a larger diameter section of the convex portion has said melt-bonding rib disposed thereon, and a smaller diameter section of the concave portion is served by the hole.

12. A tape cassette according to claim 4, wherein the cylindrical concave portion is formed in a half annular shape.

13. A tape cassette according to claim 12, wherein the cylindrical concave portion has a portion toward a center of the casing cut out.

14. A tape cassette as recited in claim 1, wherein said first projecting section and said second projecting section are cylindrical, said first projecting section having a smaller diameter than said second projecting section, and further wherein said first recessed section and said second recessed section are cylindrical with said first recessed section having a smaller diameter than said second recessed section, and further wherein a fit between said second recessed section and said second projecting section is tighter than a fit between said first recessed section and said first projecting section.

15. A tape cassette as recited in claim 1, wherein each of said concave and convex portions has a hole at a central portion thereof.

* * * * *